United States Patent [19]
Drori

[11] 4,077,425
[45] * Mar. 7, 1978

[54] FLUID FLOW CONTROL DEVICES

[76] Inventor: Mordeki Drori, 89 Zahal, Kiron, Israel

[*] Notice: The portion of the term of this patent subsequent to Mar. 7, 1994, has been disclaimed.

[21] Appl. No.: 369,978

[22] Filed: Jun. 14, 1973

[51] Int. Cl.² .......................................... F16K 31/124
[52] U.S. Cl. ................................... 137/219; 137/220; 137/505.18; 251/282
[58] Field of Search .................. 137/219, 220, 505.18, 137/536, 221, 222; 251/282

[56] References Cited

U.S. PATENT DOCUMENTS

| | | | |
|---|---|---|---|
| 2,970,806 | 2/1961 | Rexford | 251/282 X |
| 3,035,607 | 5/1962 | Quenneville | 137/505.18 |
| 3,035,608 | 5/1962 | Ray | 137/505.19 X |
| 3,251,376 | 5/1966 | Worden | 137/505.18 X |
| 3,438,391 | 4/1969 | Yocum | 137/536 X |
| 3,533,434 | 10/1970 | Smith | 137/220 |
| 3,654,950 | 4/1972 | Hamm | 137/219 |

Primary Examiner—Harold W. Weakley

[57] ABSTRACT

Fluid flow control devices comprise a cylinder and a piston movable therein in accordance with the pressure at the outlet of the device. The piston rod is fixed to a regulating sleeve which moves with the piston to enlarge or restrict a passageway from the inlet to the outlet in accordance with the outlet pressure. In several of the described embodiments, the regulating sleeve is also effective to completely close the passageway and thereby to act as an on-off valve, should the upstream water flow be terminated.

7 Claims, 10 Drawing Figures

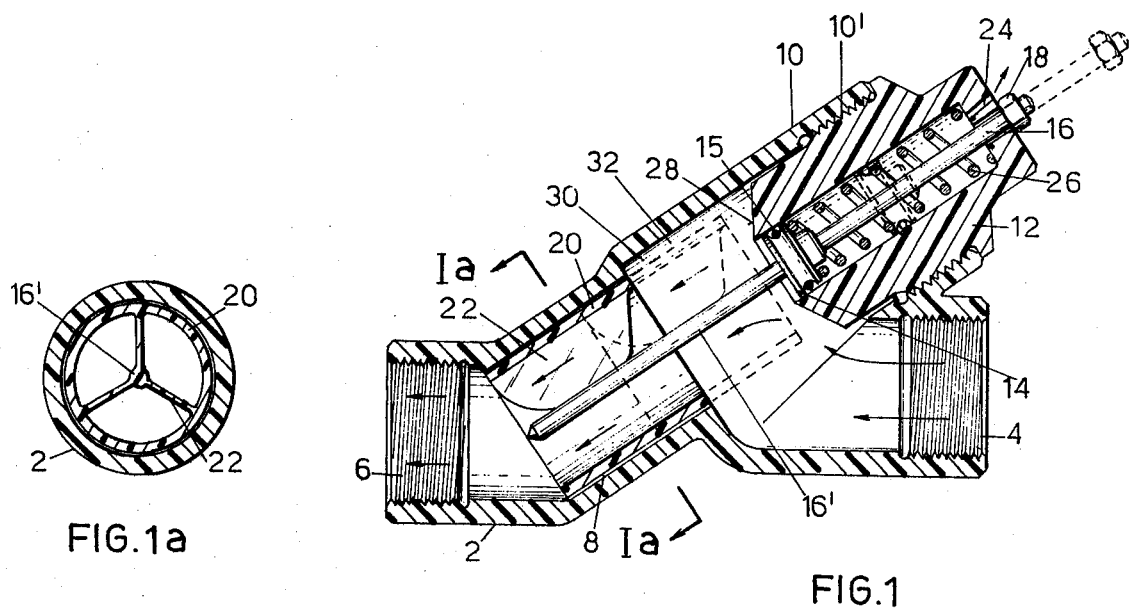
FIG.1a
FIG.1
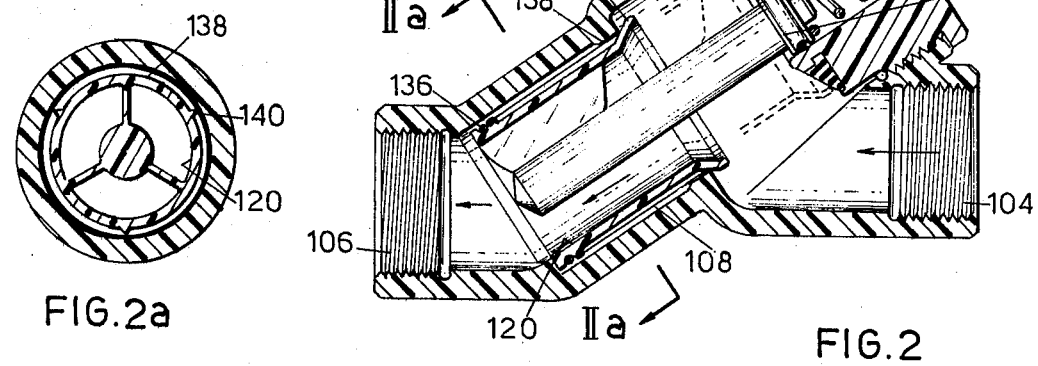
FIG.2a
FIG.2

FLUID FLOW CONTROL DEVICES

BACKGROUND OF THE INVENTION

The present invention relates to fluid flow control devices. The invention is particularly useful for automatically regulating the outlet pressure of a water supply line, and is therefore described herein with respect to that application.

A large number of water pressure regulators are known and in use. The present invention provides fluid flow control devices, and particularly water pressure regulators, which, when compared to most or all of the known devices, are sensitive and immediately responsive to small changes in pressure, simple in construction, and inexpensive to produce.

SUMMARY OF THE INVENTION

According to the present invention, there is provided a fluid flow control device comprising a housing having an inlet and an outlet joined by a passageway including a cylindrical chamber and an inwardly extending annular shoulder at the inlet end of the chamber. A sleeve, formed with a plurality of outer axial ribs engageable with the inwardly extending annular shoulder for guiding the movement of the sleeve, is axially movable within the cylindrical chamber to enlarge or restrict the passageway in order to control the fluid flow therethrough from the inlet to the outlet. The device further includes a cylinder fixed to the housing, and a piston movable within the cylinder and connected to the sleeve to move same for controlling the fluid flow through the passageway. A spring between the cylinder and piston biases the piston outwardly of the cylinder in the direction moving the sleeve to enlarge the passageway. A first annular sealing element is fixed to the cylinder in position to be engaged by one end face of the sleeve when the sleeve is moved to one extreme position, and a second annular sealing element is fixed on the outer surface of the opposite end of the sleeve to engage the inwardly extending annular shoulder of the housing when the sleeve is in this extreme position. This closing of the passageway by both ends of the sleeve when moved to this extreme position causes the control device to regulate the outlet pressure even when the water flow downstream is terminated, thereby enabling the downstream installation to be designed for the low, regulated outlet pressure.

A number of embodiments are described below. In one embodiment, the cylinder is fixed off-line of the line between the inlet and the passageway, the sleeve being movable toward and away from the cylinder to restrict and enlarge, respectively, the passageway.

In other embodiments, the cylinder is fixed on-line within the passageway by means of spider-arms supporting same within the passageway spaced from the walls thereof.

According to a further embodiment, the housing includes a second movable sleeve enclosing the first sleeve, and actuating means for moving the second sleeve to close the passageway by bringing one end of the second sleeve into sealing engagement with the cylinder and the opposite end of the second sleeve into sealing engagement with the inner face of the passageway.

Further features and advantages of the invention will be apparent from the description below.

BRIEF DESCRIPTION OF THE DRAWINGS

The invention is herein described, by way of examples only, with reference to the accompanying drawings, wherein:

FIGS. 1 and 2 are longitudinal sectional views of two forms of pressure regulators constructed in accordance with the invention, FIGS. 1a and 2a being transverse sections along lines A—A of FIGS. 1 and 2, respectively.

In the above figures, similar parts are correspondingly numbered, except the numbers are increased by "100" in the consecutive figures.

DESCRIPTION OF THE PREFERRED EMBODIMENTS

Embodiment of FIGS. 1 and 1a

Figure 3B:
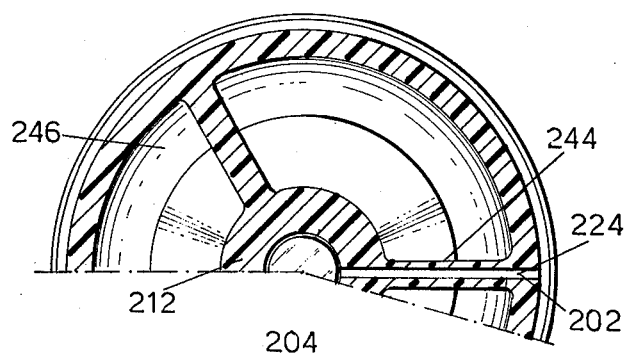
FIGS. 3 and 4 are longitudinal sectional views of two additional devices constructed in accordance with the invention, FIGS. 3a, 4a and 3b, 4b being transverse sections along lines A—A and B—B of FIGS. 3 and 4, respectively.

The pressure regulator illustrated in FIGS. 1 and 1a comprises a housing 2 having an inlet 4 at one side, and an outlet 6 at the opposite side, the two being joined by a cylindrical chamber 8. The housing is further formed with a cylindrical extension 10 coaxial with chamber 8, extension 10 terminating in internal threads 10' at its outer end. Fixed in the latter end is a cylinder member 12, being in the form of an externally threaded plug received in threads 10'. Cylinder 12 receives a piston 14 having a sealing ring 15 and a rod 16, the rod passing through the end wall of cylinder 12 and receiving a threaded nut 18. The opposite end 16' of piston rod 16 extends into cylindrical chamber 8 and is fixed to a sleeve 20 by means of a plurality (three) spider arms 22.

The interior of cylinder 12 is vented to the atmosphere by means of a vent 24. In addition, a coil spring 26 is interposed between the end wall of the cylinder and piston 14. The inner face of cylinder 12 is tapered as shown at 28.

The device illustrated in FIGS. 1 and 1a operates as follows: The water flowing from inlet 4 to outlet 6 passes through a passageway, generally designated 30, which includes the cylindrical chamber 8 in which sleeve 20 is disposed, and a larger-diameter cylindrical chamber 32 between chamber 8 and cylinder 12. Piston 14 senses the water pressure at the outlet 6, and as this water pressure increases, the piston moves rightwardly against spring 26. This movement of piston 14 causes sleeve 20 to move with it axially (rightwardly) into chamber 30 towards cylinder 12, in view of the connection (rod 16) between the piston and sleeve. This movement of sleeve 20 thus restricts the passageway 30 between inlet 4 and outlet 6, thereby decreasing the amount of water flowing to the outlet, causing the outlet pressure to drop. If the outlet pressure drops too much, piston 14 moves in the opposite direction (that is, leftwardly), carrying sleeve 20 with it, thereby enlarging the passageway 30 between inlet 4 and outlet 6, and increasing the rate of flow of the water to the outlet.

It will be seen that the regulator parts are few and simple and can be inexpensively produced. In addition, the regulator is sensitive and quickly responsive to pressure changes because the moving sealing surfaces, consisting only of sealing ring 15, are at a minimum.

The regulated outlet pressure may be preset by adjusting nut 18 on the threaded end of piston rod 16.

Embodiment of FIGS. 2 and 2a

FIGS. 2 and 2a illustrate a pressure regulator similar to that of FIGS. 1 and 1a, but including further means for positively closing-off the flow of water from the inlet 104 to the outlet 106 when the water flow is terminated downstream of the regulator. Thus, the regulator is effective to lower the outlet pressure even when there is no water flow, permitting the use of a low-pressure downstream installation, as described above.

For purposes of having the pressure regulator of FIG. 2 act also as a valve under the abve circumstances, tapered end 128 of the fixed cylinder 112 is formed with an annular sealing ring 132 cooperable with an inwardly extending shoulder 138 formed at the extreme end of cylindrical chamber 108. Also, the outer surface of sleeve 120 is formed with a plurality (three, see FIG. 2a) of axially extending ribs 140 engageable with the inner face of shoulder 138 during the movement of the sleeve. This arrangement minimizes friction during the movement of sleeve 120.

The pressure regulator of FIG. 2 operates substantially in the same manner as that of FIG. 1 to restrict or enlarge the passageway 130 between inlet 104 and outlet 106 by the axial movement of sleeve 120 in response to the outlet pressure, this being sensed by piston 114 movable within cylinder 112. However, the device of FIG. 2 also acts as a valve to close the passageway altogether, by end 134 of sleeve 120 engageing seal 132 of cylinder 112, and seal 136 engageing shoulder 138. This may occur when the outlet pressure becomes very high because of the closing of a valve downstream of the pressure regulator. End 134 of sleeve 120 is enlarged to increase the closing force should the inlet pressure suddenly increase while the regulator is closed.

In the devices of FIGS. 1 and 2, it will be seen that the cylinder (12 or 112) is fixed off-line (i.e. laterally) of the line between the inlet and the passageway (30 or 130).

Figure 3:
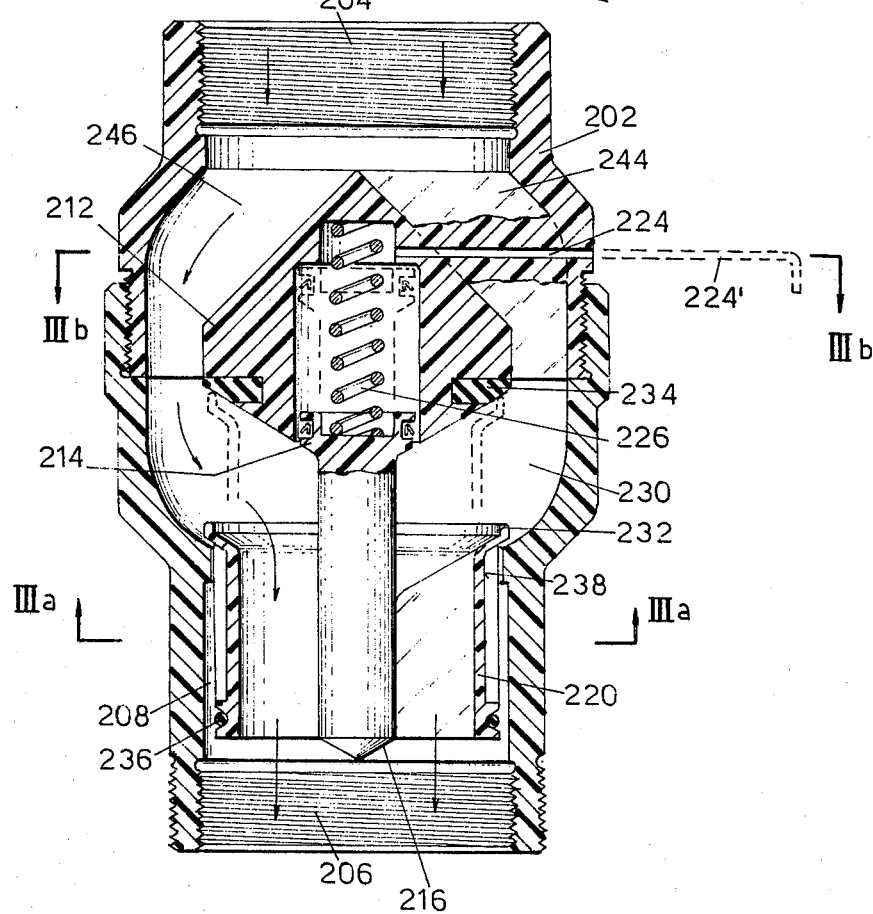
Figure 3A:
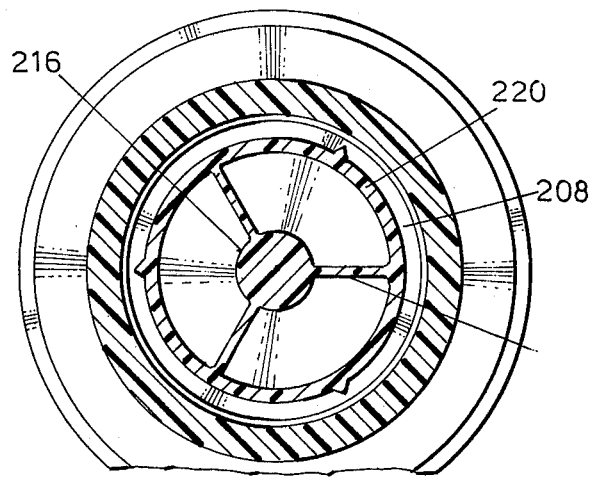

EMBODIMENT OF FIGS. 3, 3a and 3b

FIGS. 3, 3a and 3b illustrate an arrangement wherein the cylinder is fixed on-line within the passageway. For this purpose, the cylinder 212 is fixed within passageway 230 between inlet 204 and outlet 206 by means of a plurality (three) spider arms 244 fixed to the cylinder and to the wall 202 of the housing. The water flows from inlet 204 through the spaces 246 between the spider arms 244 around cylinder 212, and then through passageway 230 including its cylindrical chamber 208 in which the regulating sleeve 220 is disposed. The device of FIG. 3 is otherwise substantially the same as that of FIG. 2 and includes enlarged end 232 of sleeve 220 cooperating with seal 234 of cylinder 212, and sealing ring 236 carried at the opposite end of sleeve 220 and cooperable with the inner face of inwardly extending shoulder 238 when the water flow downstream of the regulator is terminated.

The device of FIG. 3 also includes a vent or bore 224 connected by a tube connection, shown in broken lines at 224', which may lead either to the atmosphere for venting the interior of cylinder 212 thereto, or to a source of pressure for positively actuating sleeve 220 to open or close passageway 230. For example, side 206 of the regulator may be used as the inlet, and connection 224' may be between the inlet and vent 224 so that the inlet pressure is applied to both sides of piston 214. Thus, spring 226 would tend to keep piston 214, its rod 216, and sleeve 220 at their rightmost (full-line) positions, with passageway 230 fully open. Whenever it is desired to close that passageway, the connection to vent 224 would be cut-off or interrupted, whereupon the inlet pressure from inlet 206 would be applied only to one side (the right side) of piston 214, moving same against spring 226 to cause sleeve 220 to move (to the broken-line position) to close passageway 230.

Figure 4B:
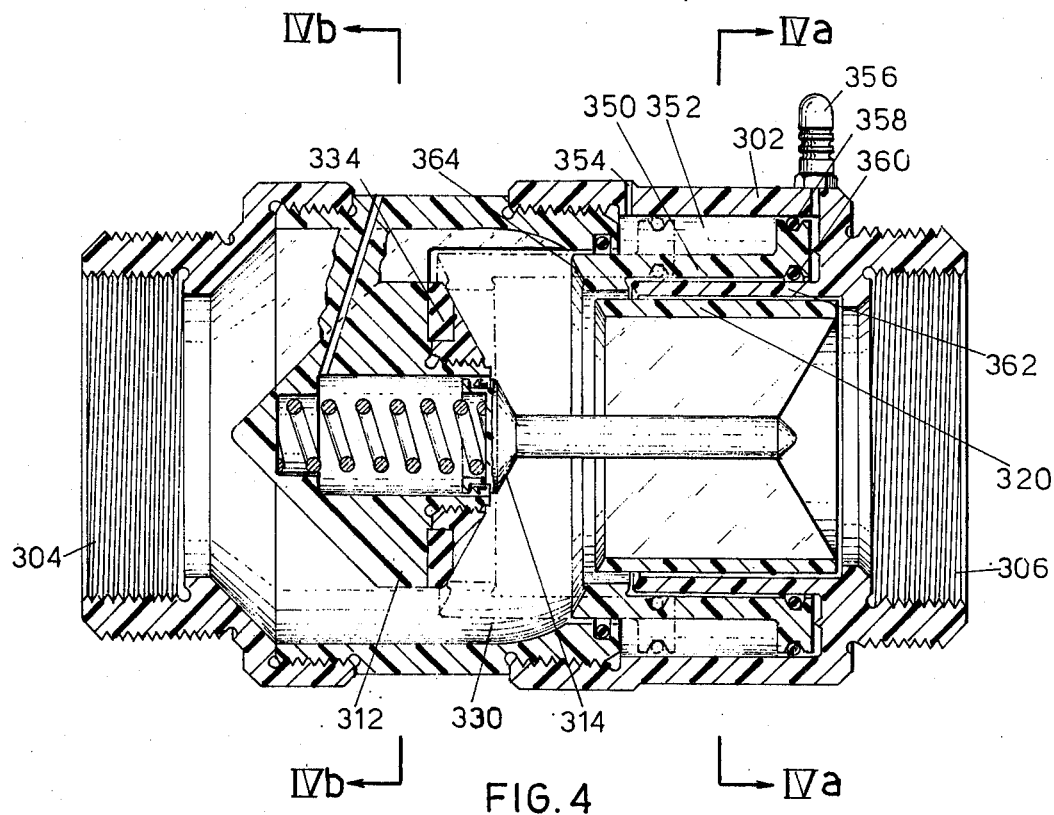
Figure 4B:
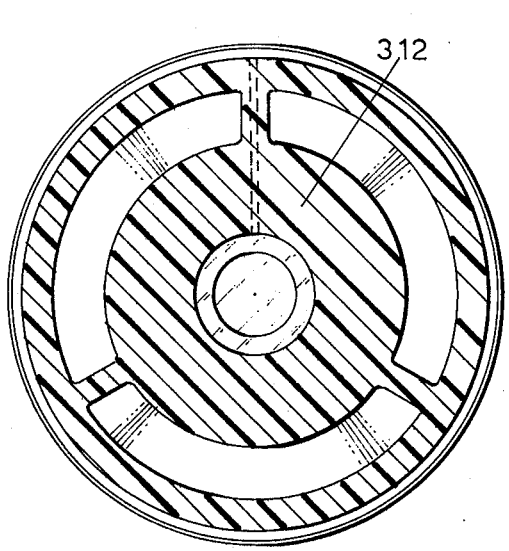
Figure 4A:
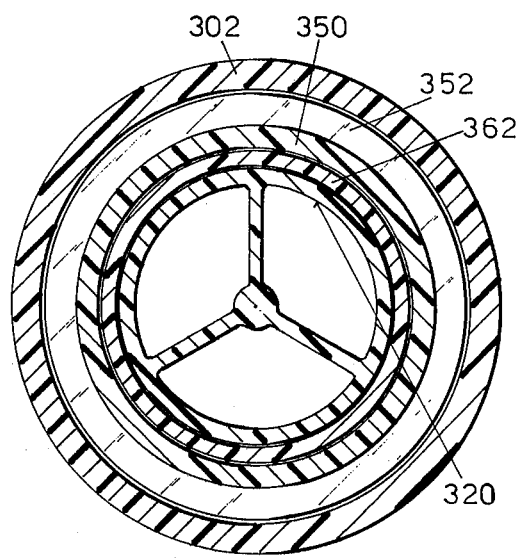

EMBODIMENT OF FIGS. 4, 4a and 4b

FIGS. 4, 4a and 4b illustrate a variation in the device of FIG. 3. In this variation, the axially moveable sleeve 320 is used only for pressure regulation, and another sleeve 350 is provided for closing the passageway to the flow of water from the inlet to the outlet. Sleeve 350 is disposed around and coaxially to sleeve 320 and is actuated to its open or closed position by means of pressure introduced into an annular chamber 352 around sleeve 350. Communicating with chamber 352 is a vent 354 to the atmosphere and a connection 356, which may be to the inlet 306. One end (right) of sleeve 350 is sealed to the housing 302 by means of a sealing ring 358 engaging the inner face of the housing, and a second sealing ring 360 engaging an annular wall 362 separating sleeve 350 from the regulating sleeve 320. The opposite end 364 of sleeve 350 is tapered to engage sealing ring 334 of cylinder 312 when sleeve 350 is actuated (to move leftwardly) to cut-off the flow of the water from the inlet 304 to the outlet 306.

It will thus be seen that, as described above with respect to the other embodiments, sleeve 320 will regulate the outlet pressure by moving axially toward or away from cylinder 312 in accordance with the outlet pressure as sensed by piston 314. Whenever it is desired to completely close passageway 330, the connection 356 to the inlet is open (this connection normally being closed) whereupon sleeve 350 is moved leftwardly by pressure applied through connection 356.

Many other variations, modifications and applications of the illustrated embodiments will be apparent.

What is claimed is:

1. A fluid flow control device, comprising: a housing having an inlet and an outlet joined by a passageway, said passageway including a cylindrical chamber having an inwardly extending annular shoulder at the inlet end thereof; a sleeve axially movable within said cylindrical chamber to enlarge or restrict said passageway in order to control the fluid flow therethrough from the inlet to the outlet; said sleeve being formed with a plurality of outer axial ribs engageable with said inwardly extending annular shoulder for guiding the movement of the sleeve; a cylinder fixed to the housing; a piston movable within the cylinder and connected to the sleeve to move same therewith for controlling the fluid flow through said passageway; a spring between the cylinder and piston biassing the piston outwardly of the cylinder to move the sleeve to enlarge said passageway; a first annular sealing element fixed to said cylinder in position to be engaged by one end face of the sleeve when moved to one extreme position; and a second annular sealing element fixed on the outer surface of the opposite end of the sleeve and engageable with said inwardly extending annular shoulder of the housing when the sleeve is in said one extreme position, said passageway thereby being closed by both ends of said sleeve when moved to said one extreme position.

2. A device according to claim 1, wherein the piston is connected to the sleeve by means of a rod fixed at one end to the piston and at the other end to spider arms carried by the sleeve.

3. A device according to claim 1, wherein said cylinder is fixed off-line of the line between the inlet and said passageway, said sleeve being movable toward and away from the cylinder to restrict and enlarge, respectively, the passageway.

4. A device according to claim 1, wherein said cylinder is fixed on-line within said passageway by means of spider-arms supporting same within the passageway spaced from the walls thereof.

5. A device according to claim 1, wherein said one end of the sleeve is enlarged to increase the closing force applied to the sleeve should the inlet pressure increase.

6. A device according to claim 1, wherein the interior of said cylinder is vented to the atmosphere.

7. A device according to claim 1, wherein the interior of said cylinder includes a connection to a fluid source for actuating said piston.

* * * * *